Aug. 26, 1969   G. FAUTH ET AL   3,463,067
PHOTOGRAPHIC CAMERA WITH FLASH UNIT
Filed Sept. 21, 1966   3 Sheets-Sheet 3

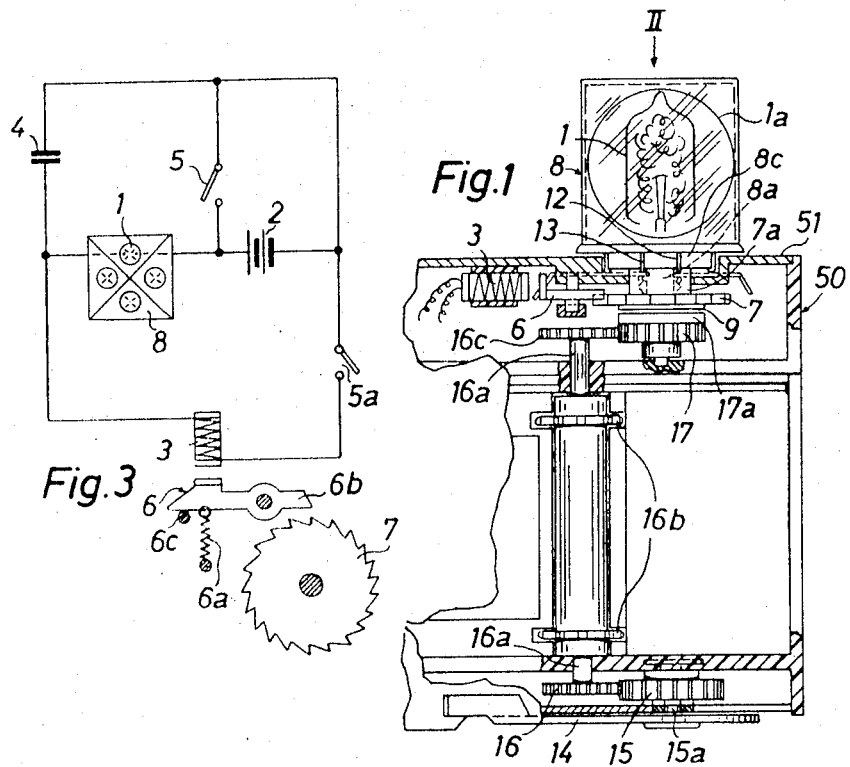
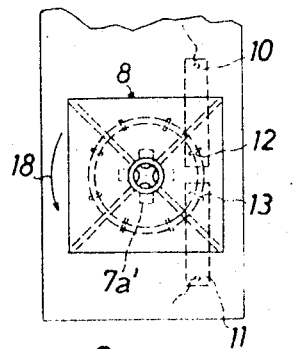

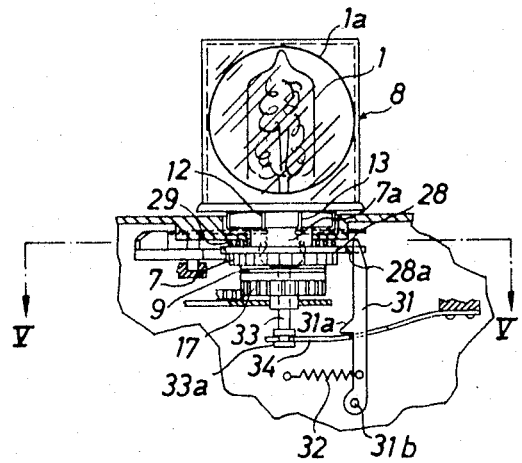

INVENTORS
GUENTER FAUTH
HELMUT NUSSER
BY Michael S. Striker
Atty

United States Patent Office 3,463,067
Patented Aug. 26, 1969

3,463,067
PHOTOGRAPHIC CAMERA WITH FLASH UNIT
Guenter Fauth, Unterhaching, Munich, and Helmut Nusser, Grafing-Stadt, Germany, assignors to Agfa-Gevaert Aktiengesellschaft, Leverkusen, Germany
Filed Sept. 21, 1966, Ser. No. 580,918
Claims priority, application Germany, Oct. 2, 1965,
A 50,397
Int. Cl. G03b 19/04, 15/03
U.S. Cl. 95—11   23 Claims

ABSTRACT OF THE DISCLOSURE

A photographic camera whose housing supports a socket for multiple flash bulb holders. The indexing mechanism for the socket is actuated by the film transporting mechanism and is connected with the socket by way of a friction clutch which permits the socket to remain idle when the indexing mechanism is operated while an unfired flash bulb faces the subject. The safety device which prevents indexing of the socket when an unfired bulb faces the subject comprises an electromagnet or a mechanical stop which is automatically deenergized or disengaged in response to firing of the flash bulb.

---

The present invention relates to photographic cameras with flash units. More particularly, the invention relates to improvements in photographic cameras of the type wherein the flash unit is preferably built into the housing of the camera and utilizes "Flashcubes" or analogous multiple flash bulb holders.

It is already known to install in a photographic camera a flash unit which utilizes indexible multiple flash bulb holders and to provide the camera with an indexing mechanism which can change the position of the holder in response to manipulation of the film transporting device or in response to release of the shutter. A serious drawback of such cameras is that a careless operator is likely to insert a partially spent multiple flash bulb holder in such position that, in response to manipulation of the device which operates the indexing mechanism, a spent flash bulb will be caused to face the subject so that the next exposure will be made without flash. For example, and assuming that a holder contains a single spent bulb and is mounted on the camera in a position wherein the fresh bulb preceding the spent bulb faces the subject, the next manipulation of the film transporting device will move the spent bulb to a position necessary for making an exposure with flash. However, no flash will be set off because the flash unit can fire only one bulb at a time, namely, the bulb which faces the subject.

Accordingly, it is an important object of the present invention to provide a photographic camera having a built-in or detachable flash unit with a very simple, reliable and compact safety device which prevents indexing of the multiple flash bulb holder when a fresh flash bulb faces the subject but invariably allows for indexing of the holder through such an angle that a fresh flash bulb is caused to assume a position in which it faces the subject during the next-following exposure.

Another object of the invention is to provide a novel multiple flash bulb holder which may be used in a camera of the just outlined characteristics.

A further object of the invention is to provide a photographic camera whose flash unit can utilize unused or partially spent multiple flash bulb holders without incurring the risk that the user would fail to make an exposure with flash, as long as the holder contains at least one unfired flash bulb.

An additional object of the invention is to provide a camera with flash unit of the type using multiple flash bulb holders and to construct and assemble the camera in such a way that a fresh flash bulb invariably assumes an optimum position for firing during the next exposure as long as the user is careful enough to insert the holder in a position in which a fresh bulb faces the subject.

A concomitant object of the invention is to provide a photographic camera of the above outlined character wherein the multiple flash bulb holder is automatically indexed in response to making of an exposure or in response to carrying out of another step or function which is necessary for proper operation of the camera prior to, during or subsequent to making of an exposure.

An ancillary object of the invention is to provide a camera of the above outlined type wherein a spent multiple flash bulb holder is automatically ejected or disengaged from the remainder of the flash unit as soon as the last of its flash bulbs has been fired.

Briefly stated, our present invention resides in the provision of a photographic camera which comprises a housing, a flash unit carried by (and preferably built into) the housing and including a rotary indexible socket which is connectable with a multiple flash bulb holder, such as a "Flashcube," indexing means operative to rotate the socket, actuating means (for example, a film transporting mechanism or a shutter release trigger) for carrying out a function in connection with the making of an exposure and for thereby operating the indexing means to rotate the socket until a fresh flash bulb faces the subject, and a safety device for holding the socket against rotation by the indexing means when an unfired flash bulb of the holder which is connected with the socket faces the subject. The safety device may be an electrical, mechanical or other suitable device.

For example, an electrical safety device may include an electromagnet which is energized in response to placing of a fresh flash bulb into a position in which the bulb faces the subject, and means for holding the socket against rotation in response to energization of the electromagnet.

It is also possible to provide the holder with deformable projections one of which engages a suitable retaining member when the respective flash bulb is unfired and faces the subject whereby the retaining member holds the socket against rotation. The safety device then preferably further comprises a deforming member which changes the configuration of the projection in response to firing of the respective flash bulb so that the socket is free to rotate in response to next operation of the indexing means in order to place the next-following undeformed projection into engagement with the retaining member.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary vertical section through a still camera with built-in flash unit which embodies one form of the present invention and utilizes commercially available multiple flash bulb holders;

FIG. 2 is a fragmentary top plan view of the camera as seen in the direction of the arrow II on FIG. 1;

FIG. 3 illustrates the flash circuit of the camera;

FIG. 4 is a fragmentary vertical section through a camera which embodies the features shown in FIGS. 1–3 and is further provided with an automatic ejector for spent multiple flash bulb holders;

FIG. 5 is a horizontal section as seen in the direction of arrows from the line V—V of FIG. 4;

Figure 6:
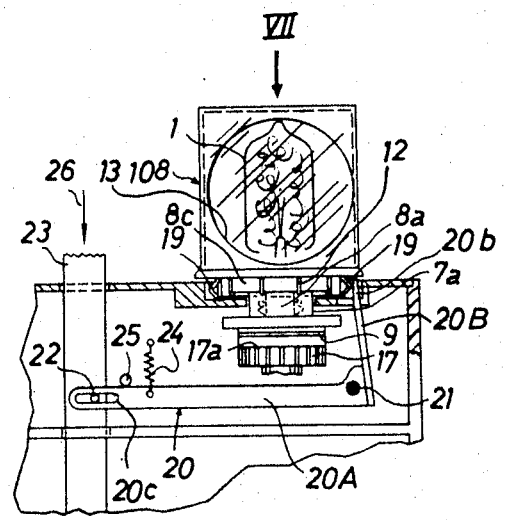
FIG. 6 is a fragmentary vertical section through a modified camera whose flash unit utilizes specially constructed multiple flash bulb holders.

FIGS. 1 and 2 show a still camera having a housing 50 whose top wall 51 is formed with a circular recess accommodating the upper portion of a rotary indexible socket 7a forming part of a flash unit and having a preferably cruciform recess 7a′ adapted to receive the plug 8a of a commercially available multiple flash bulb holder 8 sold under the name "Flashcube." This holder 8 has four vertical transparent side walls each located in front of a flash bulb 1, and each such flash bulb is located in front of a reflector 1a. The holder 8 is indexible through angles of 90 degrees or a multiple of 90 degrees to place successive flash bulbs into a position for illumination of the subject in response to completion of the flash circuit whose components are shown in FIG. 3.

The base 8c of the holder 8 carries the plug 8a which extends downwardly therefrom and is preferably of cruciform shape so that it fits snugly into the recess 7a′ and is compelled to rotate with the socket 7a when the latter is indexed by the film transporting mechanism of the camera. The base 8c is provided with four pairs of electric terminals 12, 13, one pair for each of the four flash bulbs 1. When a flash bulb faces the subject (i.e., when the axis of the respective reflector 1a is exactly or substantially parallel with the optical axis of the objective), the corresponding terminals 12, 13 engage with wto resilient terminals 10, 11 provided in the housing 50 so that the flash bulb can be fired in response to closing of a synchronizing switch 5 shown in FIG. 3. The flash circuit further comprises a battery 2 or another suitable source of electrical energy, a customary capacitor 4 which is discharged in response to closing of the synchronizing switch 5, the aforementioned terminals 10, 11 which can be conductively connected to each other by the terminals 12, 13 of a fresh flash bulb 1, and an electromagnet 3 which forms part of a novel safety device and is energizable only when the flash bulb 1 facing the subject is unfired. The safety device further comprises a pawl 6 which constitutes the armature of the electromagnet 3 and can be attracted by the latter against the opposition of a helical return spring 6a to disengage its pallet 6b from the teeth of a ratchet wheel 7. The spring 6a tends to maintain the pawl 6 in abutment with a fixed stop pin 6c.

The film transporting device of the camera comprises a customary rapid transport lever 14 which can be rocked through an angle slightly in excess of 270 degrees and is fixed to the shaft 15a of a driver gear 15 which meshes with a gear 16 on the shaft 16a of two sprocket wheels 16b having teeth entering the perforations of the film (not shown). The indexing mechanism for rotating the socket 7a and holder 8 in response to manipulation of the lever 14 comprises a first gear 16c on the shaft 16a, a second gear 17 which meshes with the gear 16c, and a friction clutch including a first clutch element 17a coaxially affixed to the gear 17 and a second clutch element 9 coaxially secured to the socket 7a. The aforementioned ratchet wheel 7 of the safety device is installed between the socket 7a and clutch element 9 and is compelled to rotate therewith. The arrow 18 indicates in FIG. 2 the direction in which the socket 7a is indexible by the lever 14.

The operation of the camera shown in FIGS. 1 to 3 is as follows:

In order to change the angular position of the socket 7a and holder 8, the operator turns the lever 14 through slightly more than 270 degrees whereby the two gear trains 15, 16 and 16c, 17 turn the clutch element 17a through 270 degrees and, if the pallet 6b of the pawl 6 is disengaged from the ratchet wheel 7, the clutch element 9 rotates through the same angle and turns the socket 7a and holder 8 through 270 degrees (arrow 18). However, and if the socket 7a places a fresh flash bulb 1 into the position shown in FIG. 3 in which the corresponding terminals 12, 13 of the base 8c engage the terminals 10, 11, the circuit of the electromagnet 3 is completed so that the latter attracts the pawl 6 against the opposition of the spring 6a, and the pallet 6b arrests the ratchet wheel 7 together with the clutch element 9 and socket 7a. Thus, the holder 8 is automatically arrested in a position in which a fresh flash bulb 1 faces the subject but the film can be transported by the full length of a frame because the clutch element 17a then slides with reference to the clutch element 9 until the lever 14 has been turned through 270 degrees. If a holder 8 with four fresh flash bulbs 1 is inserted subsequent to completion of an exposure but prior to the next-following manipulation of the lever 14, the socket 7a and the holder 8 will not rotate at all because the terminals 12, 13 for one fresh flash bulb automatically connect the terminals 10, 11 as soon as the fresh holder is coupled with the socket 7a. If the holder 8 contains three spent flash bulbs and a single fresh flash bulb and if the holder is attached in such position that a spent flash bulb faces the subject and is separated from the fresh bulb by the remaining two spent flash bulbs (as viewed in the direction of the arrow 18), the lever 14 will turn the socket 7a through 270 degrees because such angular displacement is necessary to place the terminals 12, 13 for the fresh flash bulb into current-conducting engagement with the terminals 10, 11 of the flash unit.

The exposure with flash is made in response to release of the shutter which takes place simultaneously with closing of the switch 5. The closing of switch 5 results in discharge of the capacitor 4 and in firing of a fresh flash bulb 1. When the bulb has been fired, the corresponding terminals 12, 13 cease to establish an electrical connection between the terminals 10, 11 so that the electromagnet 3 is deenergized and the pallet 6b releases the ratchet wheel 7 in response to the bias of the return spring 6a. The holder 8 is now indexible with the socket 7a, and such indexing takes place in response to the next-following manipulation of the lever 14.

In order to save electrical energy, the flash circuit of FIG. 3 may comprise a control switch 5a which is normally open and closes in response to minimal displacement of the lever 14 from its normal idle position so that the electromagnet 3 is normally deenergized even if a fresh flash bulb faces the subject. The electromagnet will be energized immediately after the operator begins to turn the lever 14, and the indexing operation takes place in a manner as described above. The angular displacement necessary to close the switch 5a may be in the range of a few degrees. The lever 14 may be connected to the shaft 15a with a small amount of clearance so that the gears 15, 16, 16c, 17 will begin to turn only when the control switch 5a is already closed.

The voltage necessary to energize the electromagnet 3 is less than the voltage necessary to fire a flash bulb 1. This insures that a fresh flash bulb is not fired when the circuit of the electromagnet is completed through the filament of such fresh flash bulb.

The terminals 10, 11 and 12, 13 are so dimensioned that they engage each other during indexing of the socket 7a for intervals of such length that the electromagnet 3 can be energized before the terminals 12, 13 of an unfired flash bulb 1 move beyond the terminals 10, 11. The width of the terminals 10, 11 and/or 12, 13 thus depends on the speed at which the socket 7a can be indexed by the indexing mechanism 16c, 17, 17a, 9 and on the delay necessary to energize the electromagnet 3 and to thereby disengage the pawl 6 from the ratchet wheel 7.

FIGS. 4 and 5 illustrate a camera whose flash unit is practically identical with the flash unit of FIGS. 1 to 3. This camera is further equipped with an automatic ejector which expels the plug of a spent holder 8 from the socket 7a. The ejector comprises a disk cam 28 having a lobe 28a and being installed between the ratchet wheel 7 and socket 7a. The cam 28 is biased by a helical torsion spring 29 so that the lobe 28a normally bears against an arresting pin 30. The central portion of the cam 28 is formed with a cruciform opening 28b which registers with the recess of the socket 7a and receives the lower end portion of the plug when the holder 8 is properly attached to the camera. Thus, the plug serves as a means to connect the cam 28 for rotation with the socket 7a when the latter is rotated by the indexing mechanism in response to actuation of the film transporting device. Indexing of the socket 7a will result in winding of the torsion spring 29 whereby the lobe 28a moves away from the arresting pin 31 by rotating in a counterclockwise direction, as viewed in FIG. 5.

The ejector further comprises an ejector member here shown as a post 33 which is reciprocable in the recess of the socket 7a and is biased upwardly by a strong leaf spring 34. One end of the spring 34 is fixedly secured to the housing of the camera and its other end is bifurcated and extends into a spool 33a fixed to the lower end portion of the post 33. The spring 34 has a cutout 34a which accommodates a median portion of a locking lever 31 pivoted at 31b and carrying a pallet or nose 31a which overlies the upper surface of the spring 34 adjacent to the cutout 34a and thus holds the post 33 in the retracted or inoperative position shown in FIG. 4. The upper end portion of the lever 31 extends into close proximity of the peripheral surface on the cam 28 and is rocked by the lobe 28a when the cam completes a little more than three-fourths of a full revolution, i.e., when the holder 8 has been indexed through more than 270 degrees. Rocking of the lever 31 in response to movement of the lobe 28a into registry with the cutout 34a disengages the nose 31a from the spring 34 whereby the latter propels the post 33 upwardly and the post expels the plug of the holder 8 from the socket 7a. The recess 7a' (see FIG. 2) extends all the way through the socket 7a so that the post 33 can move upwardly as soon as the spring 34 is free to return to its unstressed condition. The spring 34 will be caused to store energy in response to insertion of a plug 8a (FIG. 1) into the socket 7a; the post 33 is then pushed downwardly to the retracted position of FIG. 6 and the spring 34 is cocked. A spring 32 urges the locking lever 31 in a counterclockwise direction, as viewed in FIG. 4, so that the nose 31a snaps to locking position as soon as the post 33 is returned to inoperative position. The lobe 28a cannot interfere with rocking of the lever 31 by spring 32 because it automatically returns into abutment with the arresting pin 30 as soon as a spent holder 8 is ejected. This is due to the fact that the torsion spring 29 stores energy during indexing of the socket 7a and turns the cam 28 in a clockwise direction (FIG. 5) in immediate response to withdrawal of the holder. It is to be recalled that the motion transmitting connection between the socket 7a and indexing mechanism on the one hand, and the cam 28 on the other hand, is established solely by the plug 8a so that the cam 28 is free to rotate with reference to the socket when the plug 8a is withdrawn from the recess 7a'.

The ejection of a holder 8 which has been inserted with four fresh bulbs 1 will take place during the fourth indexing of the socket 7a, i.e., after the last of the four flash bulbs has been fired.

Figure 7:
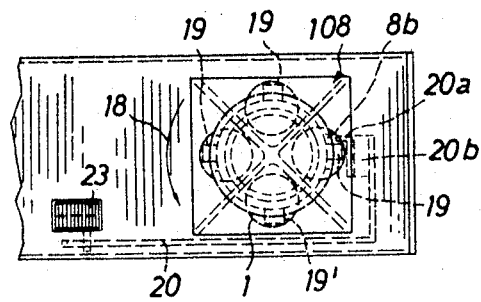
FIG. 7 is a top plan view as seen in the direction of arrow VII in FIG. 6.

FIGS. 6 and 7 show a portion of a still camera with built-in flash unit which is provided with a different safety device and wherein the flash unit utilizes a specially designed multiple flash bulb holder 108. The latter's base 8c carries four pairs of terminals 12, 13 and is further provided with four equidistant substantially V-shaped radially outwardly extending projections 19 of ductile sheet metal or the like. These projections form part of the modified safety device which further comprises a bell crank lever 20 rockable about a horizontal pivot pin 21 and having a substantially horizontal longer arm 20A provided with an elongated slot 20c for a pin 22 secured to a reciprocable shutter release trigger 23. The shorter arm 20B of the lever 20 extends upwardly and carries a deforming plate 20b provided with a short retaining finger or protuberance 20a. The lever 20 is biased by a spring 24 which urges its longer arm 20A against a fixed stop pin 25.

The construction of the film transporting device and indexing mechanism (see the parts 17, 17a, 9) is the same as described in connection with FIGS. 1 to 3. The ratchet wheel 7 is not needed.

The film transporting device can rotate the socket 7a through a little more than 270 degrees. If the socket 7a receives a holder 108 with four fresh flash bulbs 1, each of the four projections 19 on the base 8c is undeformed and extends from the base 8c in a manner as shown in FIG. 6. When the operator depresses the trigger 23 (arrow 26) to release the shutter, the flash bulb facing the subject is fired in response to discharge of the customary capacitor and the pin 22 rocks the lever 20 in a counterclockwise direction, as viewed in FIG. 6, whereby the plate 20b changes the configuration of the adjoining projection 19 by pressing it toward the periphery of the base 8c. The deformation of such projection is sufficient to permit subsequent rotation of the holder 108 through 90 degrees (arrow 18 in FIG. 7). When the trigger 23 is released, the spring 24 returns the longer arm 20A into abutment with the pin 25 whereby the retaining finger 20a is placed at such a distance from the base 8c that it cannot interfere with movement of the deformed projection 19 in response to manipulation of the film transporting device. If a holder 108 with four fresh flash bulbs 1 has been inserted subsequent to making an exposure but prior to the next-following manipulation of the film transporting device, the retaining finger 20a will extend into the path of the adjoining undeformed projection 19 and will prevent rotation of the holder 108. The clutch element 17a then slides with reference to the clutch element 9 so that the socket 7a does not rotate at all.

When the indexing mechanism is operated by the film transporting device after the plate 20b has deformed (flattened) the adjoining projection 19, the socket 7a will be rotated by the clutch 9, 17a through 90 degrees but is then arrested in a fully automatic way because the retaining finger 20a extends into the path of the next-following undeformed projection 19' (FIG. 7) and holds the socket against further rotation. In making the next exposure, the operator again depresses the trigger 23 whereby the plate 20b deforms the projection 19' and permits indexing of the socket 7a through 90 degrees in response to the next-following manipulation of the film transporting device.

Since the projections 19 are V-shaped, they can resist deformation when engaging with the retaining finger 20a because the finger will abut against one edge face of the adjoining projection. On the other hand, the plate 20b will bear against the crest of the adjoining projection and will change its configuration by flattening it against the periphery of the base 8c in response to rocking of the lever 20 by the trigger 23.

The base 8c has four peripheral notches 8b (see FIG. 7) each of which is adjacent to one of the projections 19 and receives the retaining finger 20a when the respective projection is deformed by the plate 20b.

If the operator inserts a holder 108 with a single fresh flash bulb 1 which does not face the subject when the holder is coupled to the socket 7a, the socket will be indexed through 90, 180 or 270 degrees until the fresh flash bulb faces the subject. If the single fresh flash bulb faces the subject immediately upon attachment of the holder 108, the socket 7a will not be indexed at all because the single undeformed projection 19 will cooperate with the retaining finger 20a to hold the socket against rotation.

Though not shown in FIGS. 6 and 7, the ejector of FIGS. 4 and 5 can be readily incorporated in the camera which utilizes holders 108 without necessitating any substantial modifications of the indexing mechanism. The recess 7a' then extends through the entire socket 7a and receives a portion of the post 33. The flash circuit of the camera shown in FIGS. 6 and 7 is similar to the circuit of FIG. 3 but it need not comprise the electromagnet 3 and switch 5a.

A feature common to the cameras of FIGS. 1–5 and 6–7 is that the holder 8 or 108 will be rotated until a fresh flash bulb faces the subject and is then arrested in a fully automatic way, either in response to energization of the electromagnet 3 or by an undeformed projection 19. The safety device may be modified still further in a number of ways without departing from the spirit of our invention. For example, the projections 19 or similar projections may consist of thermoplastic materials which will melt in response to firing of the associated flash bulb and then permits rotation of the socket through 90 degrees or through another angle, depending on the number of flash bulbs in the holder. The melting of thermoplastic projections can take place by heat radiated from a fired flash bulb or in response to completion of the circuit of a small electric resistance heater which melts one projection at a time whenever the corresponding flash bulb is fired. The projections may be merely softened in response to firing of the respective flash bulb and are then deformed by the plate 20b in the same way as described in connection with FIGS. 6 and 7.

Furthermore, the invention may be embodied in cameras wherein the flash unit is detachable from the camera and is provided with a customary foot insertable into a standard accessory shoe on the top wall 51 of the housing 50. The socket is then installed in the casing of the separable flash unit and is indexible by a mechanism which is installed in the camera proper but comprises means for transmitting motion to the socket through the aforementioned foot.

It is equally possible to operate the indexing mechanism by means other than the film transporting device, for example, by the release trigger 23 shown in FIGS. 6 and 7. This trigger is then mounted in such a way that it releases the shutter and completes the flash circuit in a first step, and thereupon continues to move from its idle position to operate the indexing mechanism by rotating the gear 17 shown in FIG. 6 through the intermediary of a suitable motion transmitting connection such as a pair of bevel gears or the like. The indexing mechanism may comprise a separate prime mover, for example, a spring motor, which will dissipate energy to rotate the socket 7a in response to disengagement of a catch or the like which normally blocks the indexing mechanism but releases it in response to completion of an exposure. Referring again to FIGS. 6 and 7, this would mean that the socket 7a could be rotated by a spring motor and would be normally held against such rotation by a catch which is disengaged from the socket whenever the trigger 23 is depressed. The spring motor then rotates the socket but the socket is arrested when a fresh flash bulb faces the subject, either because the electromagnet 3 is energized, because a nondeformed projection 19 is in the way, or because a nonfused thermoplastic projection prevents further rotation of the holder. The spring motor will be wound to store energy in response to rotation of the socket 7a by a holder 8 or 8a in a clockwise direction, as viewed in FIG. 2 or 7.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a housing; a flash unit carried by said housing and including a plurality of flash bulb units including at least one unfired flash bulb unit and a holder for holding said plurality of flash bulb units, said unfired flash bulb unit having a part being in original condition before firing and changing in connection with firing thereof; a rotary indexible socket connectable with said multiple flash bulb holder; indexing means operative to rotate said socket; actuating means for operating said indexing means; and a safety means having holding means for holding said socket against rotation by said indexing means while an unfired flash bulb unit held by said multiple flash bulb holder is in firing position facing the subject to be photographed, said safety means being actuatable by the flash bulb unit in said firing position when said part of such flash bulb unit is in said original condition so as to hold said socket against rotation and said safety means being not actuatable by a fired flash bulb unit whose part is in said changed condition so that the fired flash bulb unit permits rotation of said socket, and means for firing flash bulbs in said firing position, said actuating means being operative independently of said firing means.

2. A structure as set forth in claim 1, wherein said actuating means comprises a film transporting mechanism and wherein said socket is connectable with multiple flash bulb holders of the type having a plurality of equidistant flash bulb units disposed on a circle about the axis of said socket when the latter is connected with the holder.

3. A structure as set forth in claim 1, wherein said actuating means comprises a shutter release trigger and wherein said socket is connectable with multiple flash bulb holders of the type having a plurality of equidistant flash bulb units disposed on a circle about the axis of said socket when the latter is connected with the holder.

4. A structure as set forth in claim 1, wherein said socket is connectable with holders of the type having a pair of first electric terminals for each flash bulb unit and wherein said flash unit further comprises a pair of second electric terminals engageable by the first terminals of that flash bulb unit which faces the subject, said safety device comprising an electromagnet connected in circuit with said second terminals and arranged to change its condition of energization when said second terminals are engaged by the first terminals of an unfired flash bulb unit, and means for holding said socket against rotation by said indexing means in response to such change in the condition of energization of said electromagnet.

5. A structure as set forth in claim 4, wherein said electromagnet is energizable in response to engagement of said second terminals with the first terminals of an unfired flash bulb unit and wherein the voltage necessary for such energization of said electromagnet is less than that for firing of a flash bulb unit.

6. A structure as set forth in claim 5, wherein said second terminals form part of a flash circuit which further includes a source of electrical energy, capacitor means, and synchronizing switch means closable in response to shutter release to effect discharge of said capacitor means and resultant firing of the unfired flash bulb unit which faces the subject whereby such flash bulb unit terminates the electrical connection between said second terminals and brings about deenergization of said electromagnet.

7. In a photographic camera, a housing; a flash unit carried by said housing and including a rotary indexible socket connectable with a multiple flash bulb holder of the type having a pair of first electric terminals for each flash bulb, said flash unit further including a pair of second electric terminals engageable by the first terminals of that flash bulb which faces the subject; indexing means operative to rotate said socket; actuating means for operating said indexing means, said indexing means comprising a friction clutch including a first clutch element rotatable by said actuating means and a second clutch element rotatable by said first clutch element and drivingly connected with said socket; and a safety device for holding said socket against rotation by said indexing means when an unfired flash bulb of the holder which is connected with the socket faces the subject, comprising an electromagnet connected in circuit with said second terminals and arranged to change its condition of energization when said second terminals are engaged by the first terminals of an unfired flash bulb, and holding means for holding said socket against rotation by said indexing means in response to such change in the condition of energization of said electromagnet, said holding means comprising a ratchet wheel connected for rotation with said second clutch element and an armature for said electromagnet, said armature engaging said ratchet wheel in response to said change in the condition of energization of said electromagnet to thereby hold said socket against rotation so that, on further operation of said indexing means, said first clutch element rotates with reference to said second clutch element.

8. A structure as set forth in claim 7, wherein said electromagnet is energizable in response to engagement of said second terminals with the first terminals through the filament of an unfired flash bulb and wherein said armature comprises a rockable pawl which is attracted by said electromagnet when the latter is energized to thereby hold said ratchet wheel against rotation, said safety device further comprising resilient means for biasing said pawl in a direction to disengage the latter from said ratchet wheel.

9. A structure as set forth in claim 4, wherein said first and second terminals are dimensioned to engage each other during indexing of said socket for intervals of such length that the electromagnet can be energized before the first terminals of an unfired flash bulb unit move beyond the second terminals.

10. In a photographic camera, a housing; a flash unit carried by said housing and including a rotary indexible socket connectable with a multiple flash bulb holder of the type having deformable projections, one for each flash bulb and distributed in the same way as the flash bulbs; indexing means operative to rotate said socket; actuating means for operating said indexing means; and a safety device for holding said socket against rotation by said indexing means when an unfired flash bulb of the holder which is connected with the socket faces the subject, comprising a retaining member carried by said housing and extending into the path of the projection associated with that unfired flash bulb which faces the subject to thereby prevent rotation of the holder in response to operation of said indexing means, and means for charging the configuration of the respective projection in response to firing of a flash bulb so that such projection can bypass said retaining member in response to next-following operation of said indexing means.

11. A structure as set forth in claim 10, wherein said projections consist of deformable material and wherein the means for changing the configuration of such projections comprises a deforming member movable into and from deforming engagement with the projection of that flash bulb which faces the subject, and further comprising a shutter release trigger movably mounted in said housing and arranged to move said deforming member into deforming engagement with a projection in response to release of the shutter.

12. A structure as set forth in claim 11, wherein said retaining member is connected to and is movable with said deforming member.

13. A structure as set forth in claim 10, wherein said projections consist of thermoplastic material which becomes softer in response to firing of the respective flash bulbs whereby the resulting change in configuration of such projections allows said socket to rotate in response to operation of said indexing means.

14. A structure as set forth in claim 13, wherein said safety device further comprises a deforming member movable into and from deforming engagement with the thermoplastic projection of that flash bulb which faces the subject, and further comprising a shutter release trigger movably mounted in said housing and arranged to move said deforming member into deforming engagement with a projection in response to release of the shutter whereby said deforming member deforms the projection which was softened in response to firing of the respective flash bulb.

15. A structure as set forth in claim 1, further comprising ejector means for separating said socket from a spent multiple flash bulb holder in response to indexing of said socket subsequent to firing of the last unfired flash bulb unit in the holder.

16. A structure as set forth in claim 15, wherein said socket has a recess extending axially therethrough and arranged to receive a portion of the holder so that the latter is coupled for rotation with the socket when said portion extends into said recess, said ejector means comprising an ejector member reciprocably installed in said housing and movable into said recess to expel said holder portion, resilient means for biasing said ejector member into said recess, locking means for holding said ejector member against movement into said recess, and means for disengaging said locking means in response to rotation of said socket through a predetermined angle.

17. A structure as set forth in claim 16, wherein said predetermined angle exceeds 270 degrees.

18. A structure as set forth in claim 16, wherein said locking means normally engages with said resilient means and wherein said ejector member is movable to a retracted position in response to insertion of said portion of a fresh holder into the recess of said socket.

19. A structure as set forth in claim 16, wherein the means for disengaging said locking means comprises a cam having a lobe and fixed by a holder to said socket for rotation therewith, said locking means having a portion extending into the pathway of said lobe and being movable in response to engagement with said lobe to thereby release said ejector member for penetration into said recess, and resilient means for permanently biasing said lobe to a starting position in response to detachment of a holder from said socket.

20. A structure as set forth in claim 1, wherein said flash unit is built into said housing and wherein said socket is connectable with holders of the type provided with four equidistant flash bulb units.

21. In a photographic camera, a housing; a flash unit carried by said housing and including a rotary indexible socket connectable with a multiple flash bulb holder, said socket having a recess extending axially therethrough and arranged to receive a portion of the holder so that the latter is coupled for rotation with the socket when said portion extends into said recess; indexing means operative to rotate said socket; actuating means for operating said indexing means; a safety device for holding said socket against rotation by said indexing means when an unfired flash bulb of the holder which is connected with the socket faces the subject; and ejector means for separating said socket from a spent multiple flash bulb holder in response to indexing of said socket subsequent to firing of the last fresh flash bulb in the holder, comprising an ejector member reciprocably installed in said housing and movable into said recess to expel said holder portion, resilient means for biasing said ejector member into said recess, locking means for holding said ejector member against movement into said recess comprising a lever rockably mounted in said housing and having a portion engageable with said resilient means to hold the latter in stressed condition and spring means for biasing said lever into engagement with said resilient means, and disengaging means for disengaging said locking means in response to rotation of said socket through a predetermined angle comprising a cam having a lobe and fixed by a holder to said socket for rotation therewith, said lever having a second portion extending into the pathway of said lobe and being movable in response to engagement with said lobe to thereby release said ejector member for penetration into said recess and said disengaging means further comprising resilient means for permanently biasing said lobe to a starting position in response to detachment of a holder from said socket.

22. In a photographic camera as set forth in claim 1, said part of said unfired flash bulb unit being an electrical part changing its condition in connection with firing of the flash bulb unit.

23. In a photographic camera as set forth in claim 1, said part of said unfired flash bulb unit being a mechanical part changing its condition in connection with firing of the flash bulb unit.

References Cited

UNITED STATES PATENTS

| | | | |
|---|---|---|---|
| 2,258,575 | 10/1941 | MacKay | 240—37.1 |
| 3,263,068 | 7/1966 | Jakob | 240—1.3 |
| 3,312,086 | 4/1967 | Casebeer et al. | 95—11.5 X |
| 3,319,547 | 5/1967 | Parsons et al. | 240—1.3 X |
| 3,335,651 | 8/1967 | Williams et al. | 95—11 |
| 3,353,467 | 11/1967 | Ernisse et al. | 240—1.3 X |
| 3,357,329 | 12/1967 | Nerwin | 95—11 |
| 3,374,720 | 3/1968 | Harvey | 95—11.5 |

NORTON ANSHER, Primary Examiner

CHARLES E. SMITH, Assistant Examiner

U.S. Cl. X.R.

240—1.3